US010434576B2

(12) United States Patent
Reid

(10) Patent No.: US 10,434,576 B2
(45) Date of Patent: Oct. 8, 2019

(54) METHOD AND APPARATUS FOR PRODUCING METALLIC IRON FROM IRON OXIDE FINES

(71) Applicant: Kenneth John Reid, Eden Prairie, MN (US)

(72) Inventor: Kenneth John Reid, Eden Prairie, MN (US)

(73) Assignee: Reid Reactors LLC, Eden Prairie, MN (US)

( * ) Notice: Subject to any disclaimer, the term of this patent is extended or adjusted under 35 U.S.C. 154(b) by 307 days.

(21) Appl. No.: 15/405,617

(22) Filed: Jan. 13, 2017

(65) Prior Publication Data

US 2018/0036804 A1 Feb. 8, 2018

Related U.S. Application Data

(60) Provisional application No. 62/400,371, filed on Sep. 27, 2016, provisional application No. 62/370,388, filed on Aug. 3, 2016.

(51) Int. Cl.
*C21B 13/00* (2006.01)
*C21C 1/00* (2006.01)
*B22F 9/22* (2006.01)

(52) U.S. Cl.
CPC ............. *B22F 9/22* (2013.01); *C21B 13/004* (2013.01); *C21B 13/0073* (2013.01); *C21B 13/0086* (2013.01); *C21C 1/00* (2013.01); *C21B 2100/24* (2017.05); *C21B 2100/66* (2017.05); *Y02P 10/136* (2015.11); *Y02P 10/143* (2015.11)

(58) Field of Classification Search
CPC .............. C21B 13/004; C21B 13/0073; C21B 13/0086; C21C 1/00; B22F 9/22
See application file for complete search history.

(56) References Cited

U.S. PATENT DOCUMENTS

| | | | | |
|---|---|---|---|---|
| 3,227,546 A * | 1/1966 | Johnson | ............... | C21B 13/0033 75/448 |
| 4,073,642 A * | 2/1978 | Collin | ................. | C21B 13/0033 75/448 |
| 4,094,665 A * | 6/1978 | Collin | ................. | C21B 13/0033 75/10.37 |
| 4,239,530 A * | 12/1980 | Goksel | ................ | C21B 13/0046 75/478 |
| 4,732,368 A | 3/1988 | Pusateri et al. | | |
| 4,880,459 A * | 11/1989 | Coyne, Jr. | ........... | C21B 13/0073 75/384 |
| 5,470,374 A * | 11/1995 | Nakamura | ............ | B22F 1/0088 148/105 |

(Continued)

OTHER PUBLICATIONS

Pinegar et al.; Novel suspension Ironmaking technology: Part 1; Ironmaking and Steelmaking 2013 vol. 40 No. 1.

(Continued)

*Primary Examiner* — Cam N. Nguyen
(74) *Attorney, Agent, or Firm* — Vidas Arrett & Steinkraus P.A.

(57) ABSTRACT

Method and apparatus for producing direct reduced iron (DRI) powder or molten iron from iron ore fines by mixing said iron ore fines with hydrogen and oxygen and igniting the mixture in a flame reactor with flame temperatures controlled to produce solid iron powder or molten iron.

20 Claims, 12 Drawing Sheets

(56) References Cited

U.S. PATENT DOCUMENTS

| | | | | |
|---|---|---|---|---|
| 5,527,379 | A * | 6/1996 | Hirsch | C21B 13/0033 423/148 |
| 5,603,748 | A * | 2/1997 | Hirsch | C21B 13/0033 266/172 |
| 5,647,887 | A * | 7/1997 | Meissner | C21B 13/0033 75/436 |
| 5,810,906 | A * | 9/1998 | Stephens, Jr. | C21B 13/00 423/439 |
| 6,063,155 | A * | 5/2000 | Masso | C21B 13/0033 423/439 |
| 6,132,489 | A * | 10/2000 | Villarreal-Trevino | C21B 13/002 266/172 |
| 6,224,649 | B1 * | 5/2001 | Villarreal-Trevino | C21B 13/002 75/444 |
| 6,395,056 | B1 * | 5/2002 | Villarreal-Trevino | C21B 13/0033 75/496 |
| 6,802,886 | B2 * | 10/2004 | Hoffman | C22B 1/24 75/484 |
| 7,625,422 | B2 * | 12/2009 | Orth | B01J 8/18 148/630 |
| 7,632,334 | B2 * | 12/2009 | Hirsch | B01J 8/0055 148/630 |
| 8,333,821 | B2 * | 12/2012 | Di Luca | B22F 9/22 75/359 |
| 8,709,128 | B2 * | 4/2014 | Knop | C21B 13/0073 75/392 |
| 8,764,875 | B2 * | 7/2014 | Huang | C01B 3/50 585/240 |
| 8,790,442 | B2 * | 7/2014 | Englund | C21B 11/08 75/484 |
| 8,926,728 | B2 * | 1/2015 | Nepper | C21B 13/143 266/155 |
| 2001/0047699 | A1 * | 12/2001 | Hoffman | C22B 1/24 75/765 |

OTHER PUBLICATIONS

Pinegar et al.; Novel suspension Ironmaking technology: Part 2; Ironmaking and Steelmaking 2013 vol. 40 No. 1.

Louis W. Lherbler Jr.; Flame Reactor Process for Electric ARC Furnace Dust; CMP Report No. 88-1; Aug. 1988 Final Report; 174 pages.

J.M. Svohoda; Center for Materials Production; Process Metallurgy International, Inc.; Plasma and Flame Reactor Treatment of Electric ARC Furnace Dust; AFS Transactions; 91-43; 1991; pp. 405-409.

C. O. Bounds et al.; EAF Dust Processing in the Gas-Fired Flame Reactor Process; Horsehead Resource Development Company, Inc.; Lead-Zinc '90; Edited by T.S. Mackey and R.D. Prengaman; The Minerals, Metals & Materials Society, 1990; pp. 511-528.

Dobay, F.M., Antrekowitsch, H., Antrekowitsch, J., "(491c) Flash-Reactor Process for the Recovery of Dusts Containing Zn", https://www.aiche.org/conferences/aiche-annual-meeting/2009/proceeding/paper/491cflash-reactor-process-recovery-dusts-containing-zn, Nov. 11, 2009.

* cited by examiner

A) Iron Oxide Feed only

B) Iron Oxide and Hydrogen

C) B) plus Oxygen preheat

Basis 1000Kg Fe

METHOD AND APPARATUS FOR PRODUCING METALLIC IRON FROM IRON OXIDE FINES

CROSS-REFERENCE TO RELATED APPLICATIONS

This application claims priority to U.S. Provisional patent application 62/400,371 filed on Sep. 27, 2016 and 62/370,388 filed Aug. 3, 2016, the disclosures of which are incorporated herein by reference as permitted.

STATEMENT REGARDING FEDERALLY SPONSORED RESEARCH OR DEVELOPMENT

Not Applicable.

BACKGROUND OF THE INVENTION

This invention relates to steelmaking and iron ore. Steelmaking is the largest metallurgical industry in the world and since 2007 global production of iron ore to feed that industry has exceeded 2 billion tons per year. The ore has to be processed for size and grade to meet input specifications for a range of reduction processes that make metallic iron that is then further processed to make steel.

Steel is currently produced by the Blast Furnace/Basic Oxygen Furnace (BF-BOF) route, or by Electric Arc Furnaces (EAF). The BF-BOF route has high energy consumption and adverse environmental impacts, and consequently, although current world production is divided roughly 2:1 in favor of the BF-BOF route, the EAF industry is growing rapidly and is expected to surpass BF-BOF production in the foreseeable future. This will require increased production of Direct Reduced Iron (DRI).

The BF-BOF route relies on iron ore with coal as the energy source, while EAFs use mainly recycled scrap steel and electric power.

Making pig iron in Blast Furnaces generates over 1.5 tons of carbon dioxide per ton of iron. In 2014 the global steel industry released over 1.8 billion metric tons of carbon dioxide into the atmosphere.

The EAF route is more environmentally friendly and there is a growing demand for direct reduced iron (DRI) products that can be fed directly into electric arc furnaces.

Feed for the blast furnace must have carefully controlled size and strength properties and is available as lump ore, sinter or pellets. In 2014, the relative weights of iron ore materials fed to blast furnaces were approximately: lump ore 12%, sinter 54% and pellets 34%. The blast furnace consumed 94% of the iron ore delivered to the global steel industry.

Direct Reduction (DR) technologies that convert iron ore into solid iron products fall into three main categories, shaft furnaces (Midrex, HYL), rotary kiln furnaces (Inmetco, Fastmet) or fluidized bed furnaces (FINMET). There is also considerable interest in developing iron nugget technology (ITmk3) that uses pellets mixed with solid reductants that are heated and reduced to iron nodules in rotary grate furnaces. DR shaft furnaces and rotary kiln furnaces require lump ore or pellet feeds while fluidized bed furnaces, by using iron ore fines directly, have the advantage of avoiding the need for pelletization. The production of iron by DRI is a growing industry and has great potential, but currently consumes only 6% of the total global iron ore production and correspondingly accounts for only 6% of global iron production.

With increasing demand for steel, driven by population growth, but more importantly by the increase in standard of living in developing countries, there is considerable interest in the development of improved or novel DR technologies. One avenue is the development of DR processes using iron ore fines such as the current AISI/DOE sponsored project at the University of Utah.

Furthermore, all current DR processes rely on the supply of separate heat sources fired by fossil fuels. By contrast, the technology presented in this patent uses iron ore fines and generates the heat required to carry out the reduction reactions internally. The result is simple reactor geometry, reduced environmental impact and reduced capital and operating costs.

For operation with natural gas as the reducing gas, savings compared to current DT processes are approximately 30% without off-gas credit and over 45% with off-gas credit. Cost savings compared to the BF production of pig iron are approximately 25% without off-gas credit and 44% with off-gas credit. Furthermore, the carbon dioxide production per ton of iron is about one third that of the blast furnace. Currently, approximately 88% of global iron ore consumption is processed in pellet or sinter plant furnaces with natural gas being the predominant fuel. If an IFDR plant using natural gas as the reducing gas is installed next to these furnaces the IFDR hot combustible off gases can be used as a supplementary fuel.

By using hydrogen as the sole reducing agent, the carbon dioxide produced by all current iron making technologies is eliminated. Operating cost estimates compared to currently operating commercial DR plants, indicate savings over 40%. Cost savings compared to the BF production of pig iron are over 50%.

With increasing concern about global warming there is great interest in reducing carbon dioxide emissions and moving toward a hydrogen economy. Although moving from coal to natural gas in the steel industry provides significant reductions in carbon dioxide emissions any carbon based fossil fuel will generate carbon dioxide. For this reason even though natural gas based DR technologies are a move in the right direction they will eventually have to be replaced with processes using hydrogen as the reducing gas.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

BRIEF SUMMARY OF THE INVENTION

The present invention relates to a novel In-Flight direct reduction process that combines iron oxide fines with reducing gases and internal heat generation gases comprising a stoichiometric mixture of hydrogen and oxygen. The reaction temperature is controlled by adjusting the flow rate of the heat generating gas.

The iron oxide, reducing gas and heat generating gases are ignited in the In-Flight reactor and reduction reactions take place rapidly in the resulting reducing flame. The speed of reaction is a function of particle size and the reduction reactions proceed faster as particle size decreases. Feed solids are typically less than 3 mm, but treatment of coarser feed solids may be practical if the reduction characteristics are favorable.

Significant improvement in energy efficiency can be achieved by prheating the feed materials by heat exchange with the hot reactor products. This can be carried out preferably by entraining the iron oxide fines in the feed reduction gas stream and pre-heating the solids/gas mix. Alternatively the iron oxide fines can be pre heated independently prior to entrainment in the reducing gas stream. The feed oxygen may also be pre heated.

A novel feature of the invention is the on-site generation of the required hydrogen and oxygen by electrolysis of the water produced in the reduction reactions and subsequent recycling of the hydrogen and oxygen. Solid biofuels, such as fine sawdust or industrial waste products with significant iron, may also be incorporated into the pre-combustion mixture.

The reaction temperature can be controlled to produce either solid iron fines or molten iron. If solid iron fines are produced, a portion of the heat content in the product stream can be recovered by heat exchange with the iron oxide/gas feed stream. The feed stream is thereby pre-heated prior to being fed into the In-Flight reactor. The iron product is separated by high temperature gas filtration or any other conventional solid/gas separation equipment or by magnetic separation if the solid iron product temperature is below the Curie point. The solid iron product is briquetted for transportation to steelmaking facilities.

If the In-Flight reduction process is located adjacent to an electric arc furnace facility and operated at higher temperatures the molten iron can be fed directly into the electric arc furnace. Alternatively if, for transportation purposes, a granular product is required the molten iron product can be fed tangentially into a high temperature cyclone with spray underflow discharge into a cooling zone for solidification or the molten iron can granulated by any other conventional liquid metal granulation process, or cast into pigs.

If the solid feed is predominantly magnetite ($Fe_3O_4$) and the reducing gas is hydrogen, the process outputs are 3 moles of Fe and two moles of $O_2$. If the solid feed is predominantly hematite ($Fe_2O_3$) the process outputs are 2 moles of Fe and 1.5 moles of $O_2$.

If the solid feed is predominantly magnetite ($Fe_3O_4$) and the reducing gas is natural gas, the process outputs are 3 moles of Fe and an off gas containing carbon monoxide, carbon dioxide, hydrogen and steam plus a small amount of methane. After separating the metallic iron the gases can be used as a supplement to the fuel for pellet or sinter plant furnaces.

If the solid feed is predominantly hematite ($Fe_2O_3$) and the reducing gas is natural gas, the process outputs are 2 moles of Fe and an off gas containing carbon monoxide, carbon dioxide, hydrogen and steam. After separating out the metallic iron the off gases can be used a supplemental fuel for pellet or sinter plant furnaces.

BRIEF DESCRIPTION OF THE DRAWINGS

A detailed description of the invention is hereafter described with specific reference being made to the drawings in which.

DETAILED DESCRIPTION OF THE INVENTION

Figure 1:
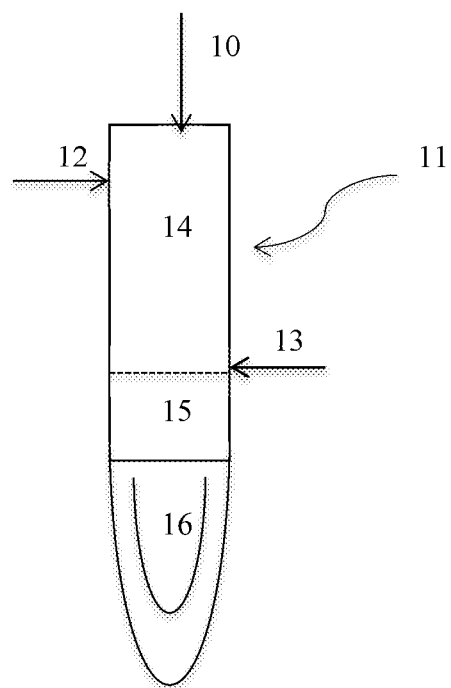
FIG. 1 is a schematic representation showing the basic functions of the In-Flight Reactor using hydrogen as the reducing gas.

The In-Flight reactor relies on conventional burner design. FIG. 1 is a schematic representation of an In-Flight reactor 11 with hydrogen as the reducing gas. Hydrogen 10, iron oxide fines 12 and oxygen 13 are fed into the pre-mx zone 14 prior to passage into the burner nozzle section 15 and then into the reaction flame 16.

Figure 2:
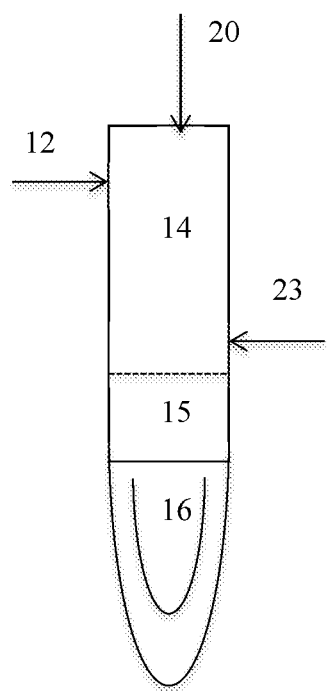
FIG. 2 is a schematic representation showing the basic functions of the In-Flight Reactor using natural gas as the reducing gas.

FIG. 2 is a schematic representation of an In-Flight reactor 11 with natural gas as the reducing gas. Natural gas 20, iron oxide fines 12 and heating gas 23 are fed into the pre-mix zone 14 prior to passage into the burner nozzle section 15 and then into the reaction flame 16. If desired the feed materials can be pre-mixed externally.

Figure 3:
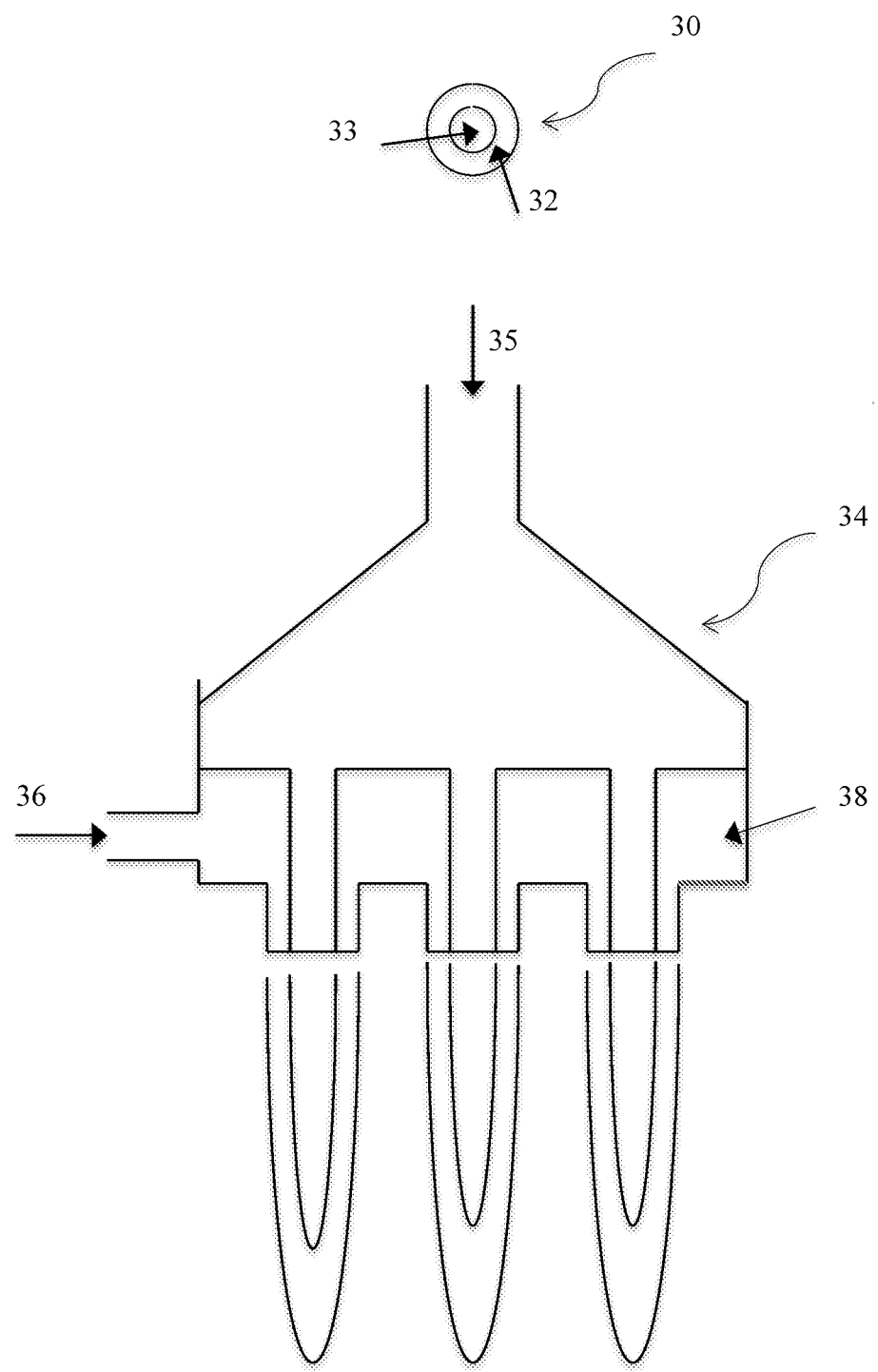
FIG. 3 is a schematic diagram of a nozzle section and a multiple nozzle assembly with annular oxygen feed directly into the flame.

The nozzle 30 can be a single large diameter nozzle or an assembly of several small diameter orifices as shown in FIG. 3. A cross section of a single annular nozzle 30 shows the annulus 32 for oxygen and the central feed tube 33 for the iron oxide/reducing gas mixture. A cross section of a multiple nozzle head 34 shows the iron oxide/reducing gas feed 36 into the multiple nozzle head and the oxygen feed 35 into the oxygen plenum 38. The multiple head nozzle shown in section in FIG. 3 has one central nozzle surrounded by six nozzles in a circle. If larger throughputs are needed, nozzles can be added in circles of increasing diameter.

Figure 4:
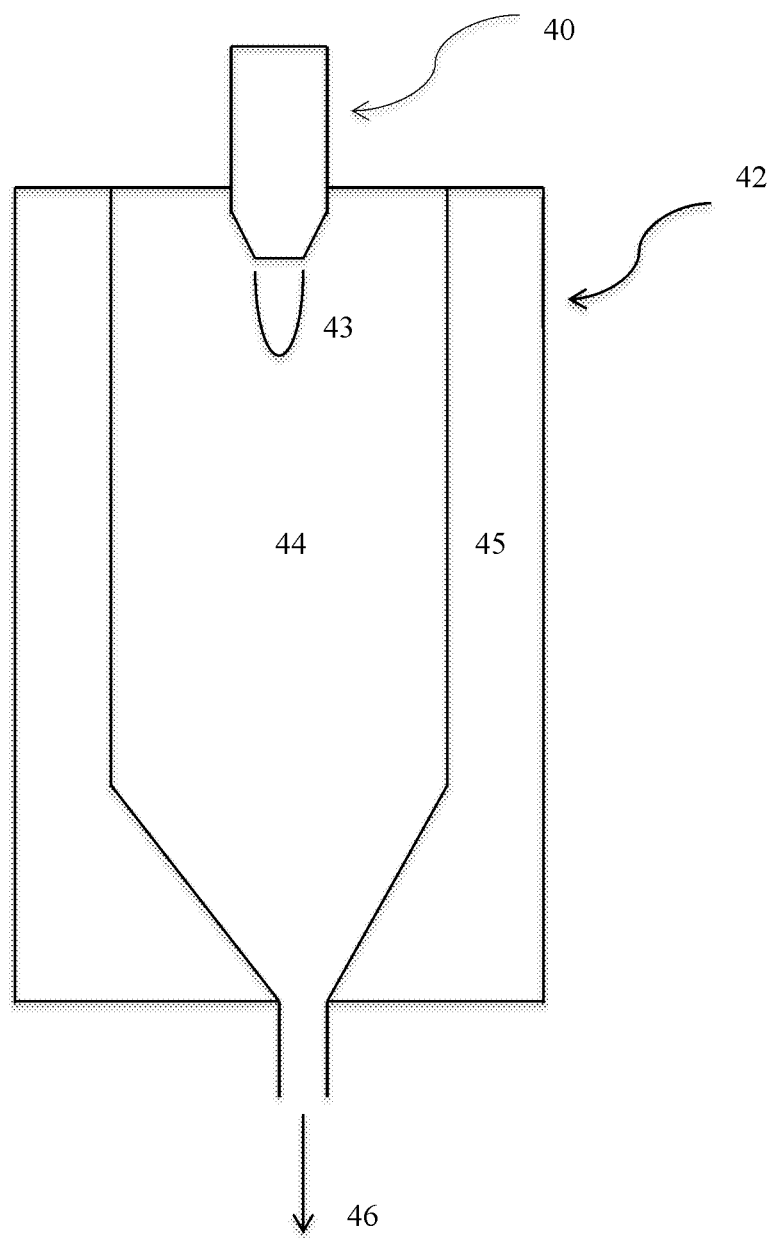
FIG. 4 is a schematic diagram of the reaction column.

FIG. 4 shows a schematic representation of the reactor column assembly 42 with the In-Flight reactor 40 mounted at the top. The reducing flame 43 is created at the top of the reaction column 44 that has refractory insulation 45. The hot product gases and entrained iron 46 exit the bottom of the reaction column.

If the process is operated at lower temperatures to produce a solid metallic iron product the solids are removed by high temperature gas filtration, by any other conventional solid/gas separation equipment or by magnetic separation if the solid iron product temperature is below the Curie point. The solid iron product is briquetted for transportation to steelmaking facilities as shown in FIG. 8.

Figure 12:
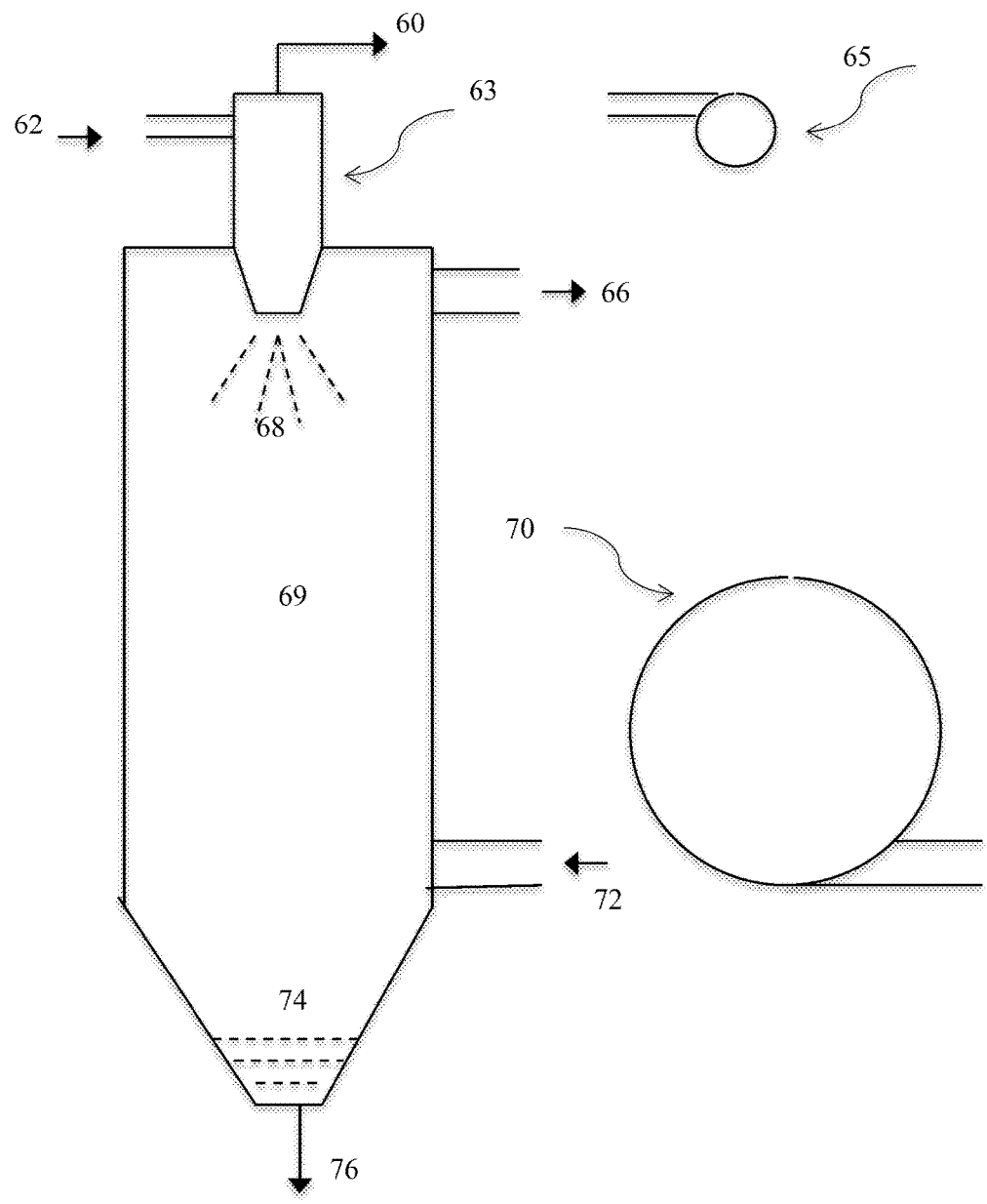
FIG. 12 is a schematic representation showing granulation of molten iron.

If the process is operated at a higher temperature and the iron product is molten then the molten iron is separated in a high temperature cyclone, or any other high temperature solid/liquid separation equipment and can be collected in a molten bath or fed directly into an electric arc furnace. If a granular product is required for transportation purposes, FIG. 12 shows a schematic representation of the high temperature cyclone 63 with plan view 65 showing the tangential feed 62. The separated gas stream 60, exits axially at the top. The cyclone is operated with a spray underflow discharge 68 into a cooling column 69 for solidification. Cooling gas 72 is introduced at the bottom of the cooling column with tangential inlet shown in the plan view 70 and discharges, also tangentially, at the top 66. The granulated iron 74 collects at the bottom of the cooling column for periodic discharge 76. Any other conventional granular metal process may be employed for producing the granular product.

The speed of reaction is a function of particle size and the reduction reactions proceed faster as particle size decreases. Feed solids would be typically less than 3 mm but treatment of coarser feed solids may be practical if the reduction characteristics are favorable. Reaction times are typically of the order of 10 seconds or less.

Figure 8:
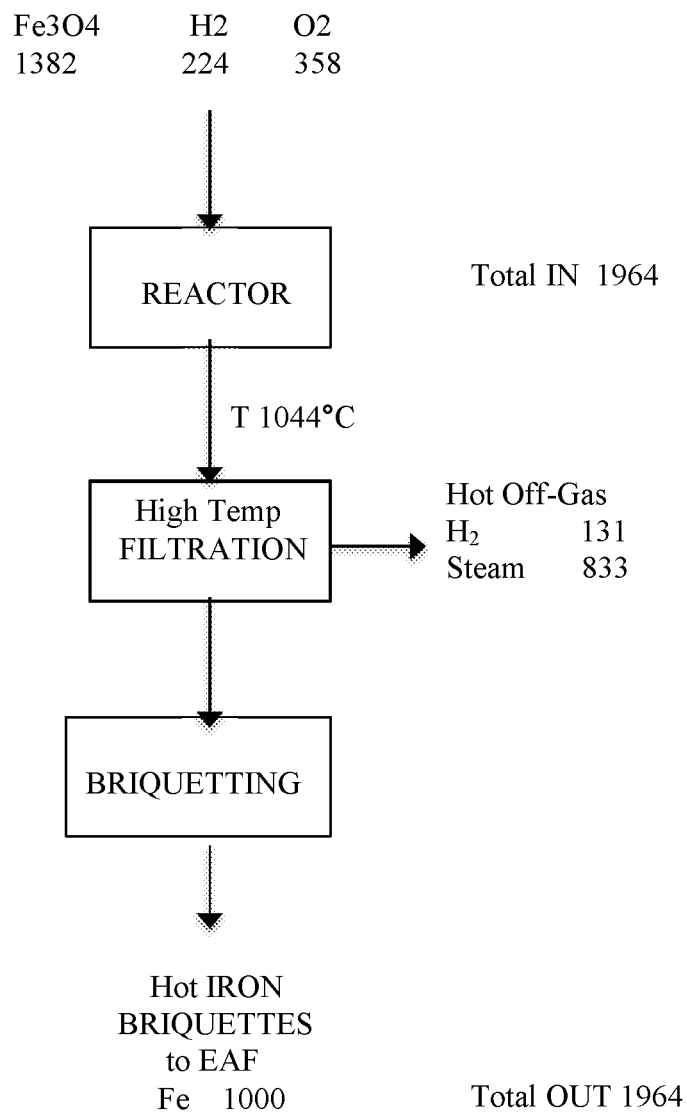
FIG. 8 shows an Open Circuit Flow Diagram and Mass Balance with hydrogen as the reducing gas.

An open circuit mass balance is shown in FIG. 8, in which hydrogen is used both for reduction and for heat generation. For the production of 1000 kg of iron the hydrogen feed requirement is 224 kg and the temperature of the solid metallic iron product is 1044° C. Higher temperatures can be achieved, if desired, simply by increasing the hydrogen and oxygen heating gas input.

Figure 5:
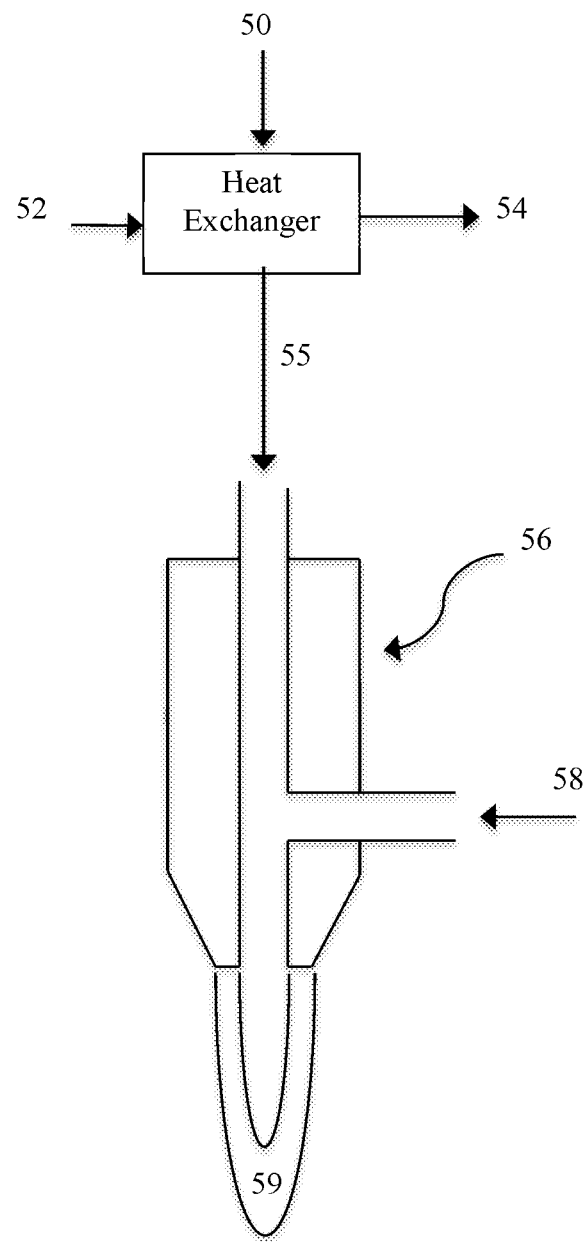
FIG. 5 presents the basic In-Flight Reactor Configuration with Preheat and with hydrogen as the reducing gas.

Significant improvement in energy efficiency can be achieved by preheating the feed materials by heat exchange with the hot reactor products. FIG. 5 is a schematic diagram of a heat exchanger in which the iron oxide fines and hydrogen mix 50 are heated by the hot IFDR product 52 which then exits as cooled product 54. The preheated feed 55 enters the reactor 56 and combines with oxygen input 58 to generate the reducing flame 59.

Figure 6:
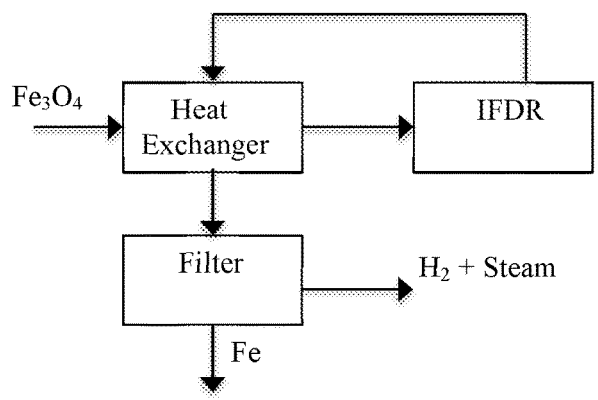
FIG. 6 shows three preheating options.
Figure 6:
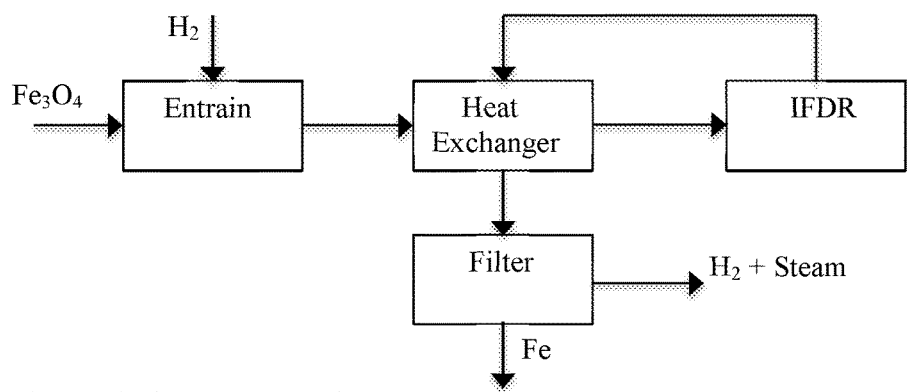
Figure 6:
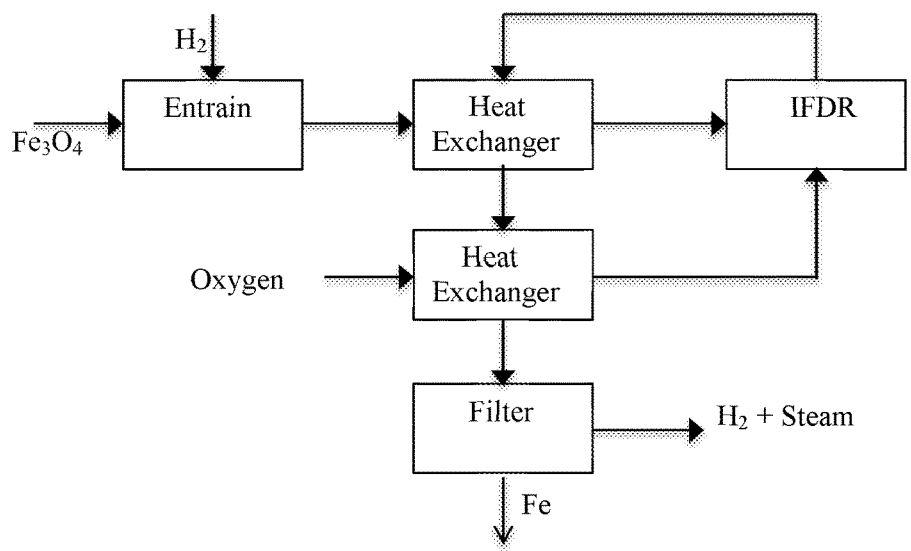

Preheat can be carried out preferably by entraining the iron oxide fines in the feed reduction gas stream and preheating the solids/gas mix. Alternatively the iron oxide fines and the reducing gas stream may be preheated independently, prior to mixing. The feed oxygen may also be preheated. Some preheat options are shown in FIG. 6.

Figure 7:
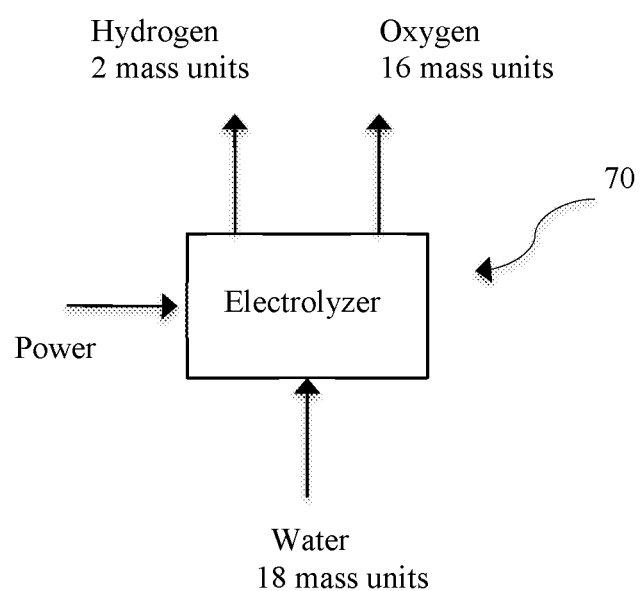
FIG. 7 is a schematic representation of an electrolyzer.

The hydrogen and oxygen are produced on site in an electrolyzer 70 represented diagrammatically in FIG. 7.

The reaction flame is a hot reducing gas and the iron oxide is rapidly converted into metallic iron in a hot gas stream containing the excess reducing gas and steam.

Figure 9:
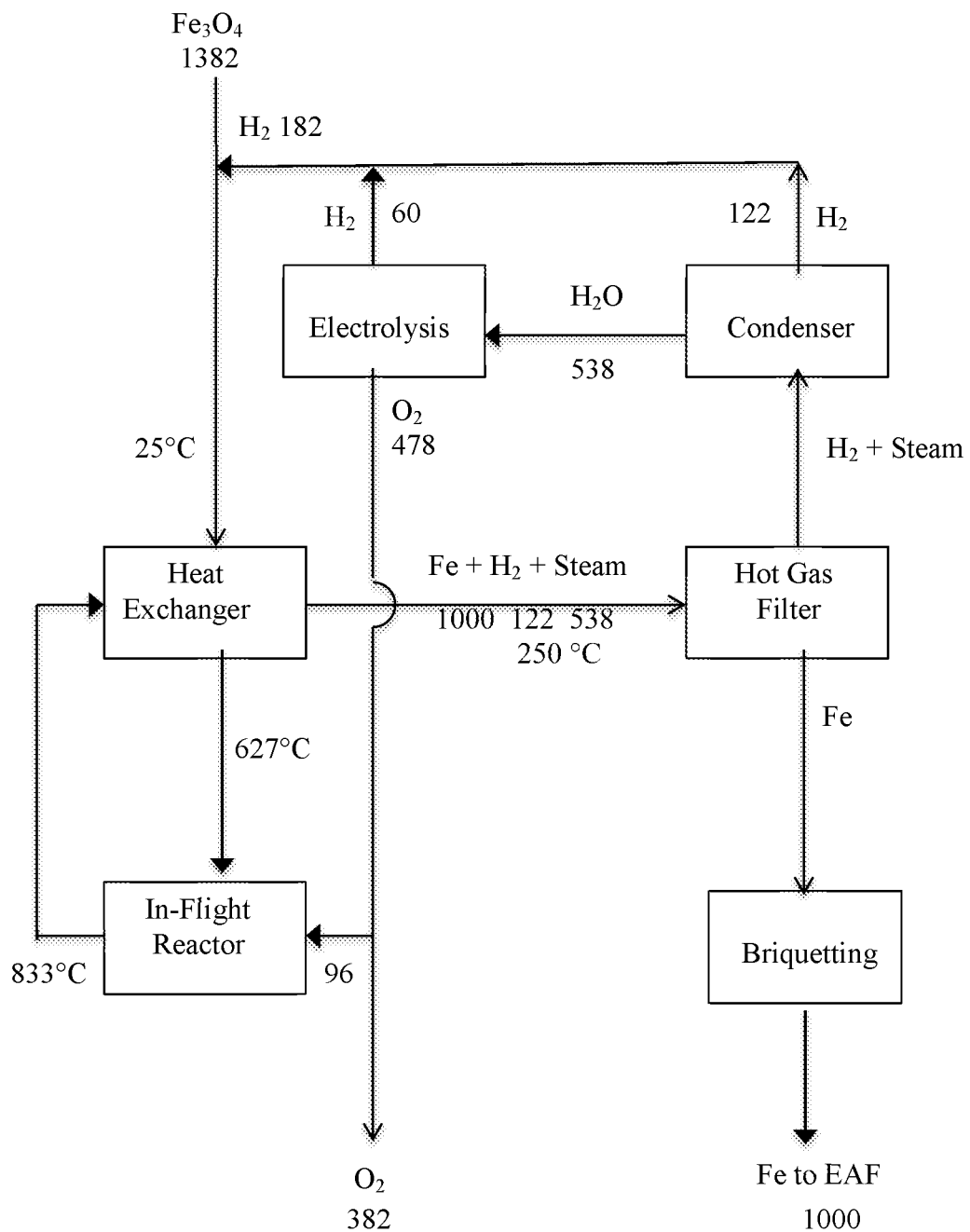
FIG. 9 is a Closed Circuit flow diagram and mass balance with preheat of $Fe_3O_4$ and hydrogen.
Figure 10:
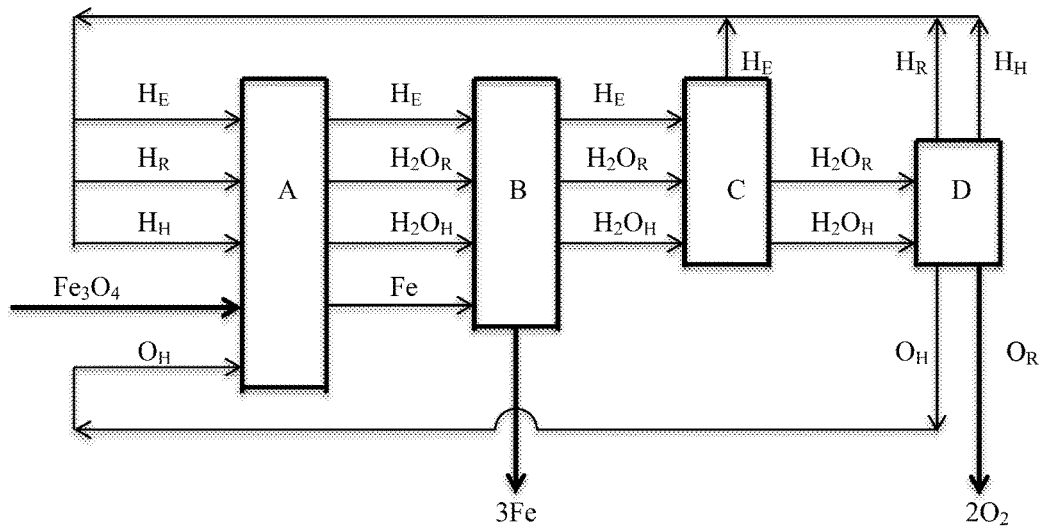
FIG. 10 is a schematic representation of the flow of materials with recycle of hydrogen and oxygen.

If hydrogen is the reducing gas the remaining gas, after removal of the metallic iron, contains only hydrogen and steam. This is fed into a condenser and liquid water is removed for recycling to the electrolyzer. The remaining hydrogen is recycled into the feed hydrogen stream. The hydrogen and oxygen produced by electrolysis are recycled to the IFDR unit. The final products are metallic iron and oxygen. FIG. 9 shows the flowsheet and mass balance for closed circuit operation with preheat and recycling of hydrogen and oxygen. Note that the hydrogen demand for the production of 1000 kg of iron has decreased from 224 H2 in the open circuit case shown in FIG. 8 to 182 H2, an 18% reduction. However this hydrogen is obtained from the condensed water by electrolysis and consequently there is no net consumption of hydrogen.

Figure 11:
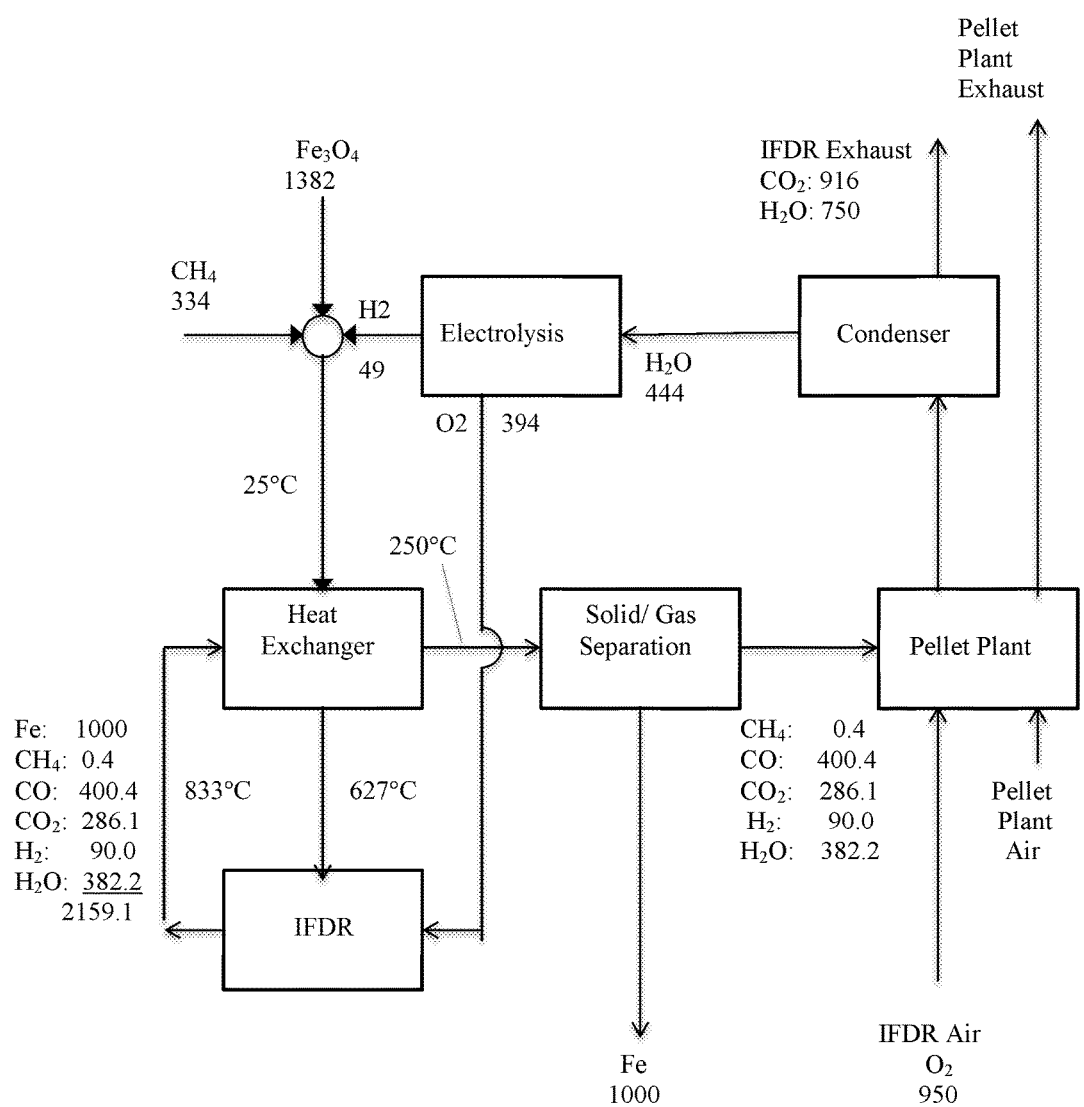
FIG. 11 shows the Flowsheet and Mass Balance for the IFDR components in an integrated IFDR/Pellet Plant installation.

FIG. 11 is a different representation of closed circuit operation focusing on the material flows. The feed hydrogen is divided into three components: $H_R$ for reduction, $H_E$ for excess and $H_H$ for heat generation. $O_R$ is the oxygen contained in the iron oxide and $O_H$ the oxygen required for generating heat. The four process units are A: IFDR, B: Solid Separation, C: Condensation and E: Electrolysis.

If the IFDR plant is adjacent to a pellet or sinter plant, any excess oxygen can be used to produce enriched air for the pellet or sinter plant furnaces.

If natural gas is used for the reducing gas the reactor products are metallic iron entrained in a hot gas stream containing carbon monoxide, carbon dioxide, hydrogen and steam plus a small quantity of residual methane. In most cases IFDR plants using natural gas as the reducing gas would be located next to a pellet or sinter plant where fine iron oxide feed materials are readily available. The hot combustible off gas can be used directly as a supplemental fuel for the pellet or sinter plant furnaces as illustrated in FIG. 11.

In-Flight Iron (IFI) is produced in a combustion reactor fed by fine iron oxide, a reducing gas and an internal heat generating gas. Typical iron ore fines are predominantly either magnetite ($Fe_3O_4$) or hematite ($Fe_2O_3$). Other iron ore mineral fines or fine biomass, or industrial waste products with high enough iron content may be used as feed materials or combined with high-grade ores.

The combined mixture of gas streams and entrained solids is ignited and forms a reducing flame. Depending on selected operating conditions, the metallic iron product can be either solid or liquid.

The process can be operated at elevated pressures. However, the design pressure will vary depending on the balance between reduced capital costs and increased operating costs.

The Following mass balances were obtained using the NASA CEARUN thermodynamic program. The IFDR product composition depends on a) the proportion of excess reducing gas and b) the flow rate of internal heating gas. The mass balances were calculated with the objective of finding product temperatures achieving high recovery of metallic iron while minimizing both excess reducing gas and internal heating gas requirements. Excess Ratio is the ratio of excess reducing gas to gas required for reduction. The basis for all calculations was 1000 Kg metallic iron product.

If natural gas is used as the reducing gas a hot combustible gas remains after the metallic iron is removed. This can be profitably used as a valuable fuel supplement in adjacent pellet plant or sinter plant furnaces. This approach is expected to be more cost effective than cleaning by conventional methods to yield pure syngas, but could be possible in favorable circumstances.

| Case 1: | Iron Oxide: | | | Hematite | | |
|---|---|---|---|---|---|---|
| | Flowsheet: | | | Open Circuit | | |
| | Reducing Gas: | | | Methane | | |
| | Excess Ratio: | | | 3.1 | | |
| | Iron Phase: | | | Solid | | |
| | Product Temperature: | | | 781° C. | | |
| Feed: | $Fe_2O_3$ | $CH_4$ | $H_2$ | $O_2$ | | Total |
| Kg | 1,430 | 440 | 80 | 640 | | 2590 |
| | | O = 2070 | F = 520 | O/F = 3.9808 | | |
| Product: | Fe | $CH_4$ | $H_2$ | CO | $CO_2$ | $H_2O$ | Total |
| Kg | 1000.4 | 1.7 | 129.83 | 497.02 | 421.32 | 539.73 | 2590 |
| Gas wt % | | 2.5 | 8.5 | 28.4 | 31.6 | 29.0 | |

The hot gas stream contains 36.9% by mass of a hydrogen rich syngas with molar $H_2$/CO ratio of 4.19. The remaining gases are steam, 29.0%, $CO_2$, 31.6% and methane 2.5%.

| Case 2: | Iron Oxide: | Magnetite |
|---|---|---|
| | Flowsheet: | Open Circuit |
| | Reducing Gas: | Methane |
| | Excess Ratio: | 3.0 |

| | | | | | | |
|---|---|---|---|---|---|---|
| Iron Phase: | | | Solid | | | |
| Product Temperature: | | | 910° C. | | | |

| Feed: | $Fe_3O_4$ | $CH_4$ | $H_2$ | $O_2$ | | Total |
|---|---|---|---|---|---|---|
| Kg | 1,382 | 382 | 77.6 | 620.75 | | 2462.35 |
| | | O = 2002.75 | F = 459.6 | O/F = 4.3576 | | |

| Product: | Fe | $CH_4$ | $H_2$ | CO | $CO_2$ | $H_2O$ | |
|---|---|---|---|---|---|---|---|
| Kg | 1000.3 | 0.06 | 110 | 462.3 | 321.2 | 568.9 | 2462.46 |
| Gas wt % | | 0.00 | 7.5 | 31.6 | 22.0 | 38.9 | 100 |

The hot gas stream contains 39.1% by mass of a hydrogen rich syngas with molar $H_2/CO$ ratio of 3.32. The remaining gases are steam, 38.9%, $CO_2$, 21.96% and a trace of methane.

| Case 3: | Iron Oxide: | Magnetite |
|---|---|---|
| | Flowsheet: | Closed Circuit |
| | Preheat Temperature: | 627° C. |
| | Reducing Gas: | Methane |
| | Excess Ratio: | 2.5 |
| | Iron Phase: | Solid |
| | Product Temperature: | 833° C. |

| Feed: | $Fe_2O_3$ | $CH_4$ | $H_2$ | $O_2$ | Total |
|---|---|---|---|---|---|
| Kg | 1383 | 334 | 49 | 394 | 2160 |
| | | O = 1777 | F = 383 | O/F = 4.64 | |

| Product: | Fe | $CH_4$ | $H_2$ | CO | $CO_2$ | $H_2O$ | |
|---|---|---|---|---|---|---|---|
| Kg | 1000 | 0.4 | 90.0 | 400.4 | 286.1 | 382.7 | 2159.6 |
| Gas wt % | | 0.01 | 7.76 | 34.53 | 24.67 | 33.0 | |

The hot gas stream contains 42.29% by mass of a hydrogen rich syngas with molar $H_2/CO$ ratio of 3.15. The remaining gases are 24.67% $CO_2$ and 33% steam.

| Case 4: | FIG. 8 | |
|---|---|---|
| | Iron Oxide: | Magnetite |
| | Flowsheet: | Open Circuit |
| | Reducing Gas: | Hydrogen |
| | Excess Ratio: | 3.7 |
| | Iron Phase: | Solid. |
| | Product Temperature: | 1185° C. |

| Feed: | $Fe_3O_4$ | $H_2$ | $O_2$ | Total |
|---|---|---|---|---|
| kg | 1382 | 224 | 406 | 2012 |
| | | O = 1788 F = 224 O/F = 7.9821 | | |

| Product: | Fe | $H_2$ | $H_2O$ | Total |
|---|---|---|---|---|
| kg | 1000 | 125 | 887 | 2012 |
| Gas wt % | | 12.4 | 83.6 | |
| $H_2$ used | | 99 (44.2%) | | |

The hot gas stream contains 12.4% by mass of hydrogen and 83.6% steam.

| Case 5: | FIG. 9 | |
|---|---|---|
| | Iron Oxide: | Magnetite |
| | Flowsheet: | Closed Circuit |
| | Preheat Temperature: | 627° C. |
| | Reducing Gas: | Hydrogen |
| | Excess Ratio: | 2.8 |
| | Iron Phase: | Solid |
| | Product Temperature: | 833° C. |

| Feed: | $Fe_3O_4$ | $H_2$ | $O_2$ | Total |
|---|---|---|---|---|
| kg | 1382 | 182.6 | 95.5 | 1660.1 |
| | | O = 1477.5 F = 182.8 O/F = 8.0915 | | |

| Product: | Fe | $H_2$ | $H_2O$ | Total |
|---|---|---|---|---|
| kg | 1000 | 122.4 | 538.1 | 1660.1 |
| Gas wt % | | 12.4 | 83.6 | |
| $H_2$ used | | 60.2 (33.0%) | | |

Note:
The excess hydrogen is directly recycled from the condenser and the hydrogen contained in the water is recovered by electrolysis and recycled. Consequently there is no net consumption of hydrogen and the only off gas is 382 kg of oxygen.

| Case 6: | Iron Oxide: | Magnetite |
|---|---|---|
| | Flowsheet: | Open Circuit |
| | Reducing Gas: | Hydrogen |
| | Excess Ratio: | 7.9 |
| | Iron Phase: | Liquid |
| | Product Temperature: | 1589° C. |

| Feed: | $Fe_3O_4$ | $H_2$ | $O_2$ | Total |
|---|---|---|---|---|
| Kg | 1,382 | 405.9 | 907.2 | 2695.1 |

| Product: | Fe | $H_2$ | $H_2O$ | |
|---|---|---|---|---|
| Kg | 997.8 | 243.5 | 1450 | 2691.3* |
| Gas wt % | | 14.38 | 85.62 | 100 |

2.2% Fe loss to minor iron species.

The hot gas stream contains 18.5% by mass of hydrogen and 81.5% steam. With pre-heating and recycling hydrogen demand is reduced by 18%.

| Case 7: | FIG. 11. Off gas to Pellet Plant | |
|---|---|---|
| | Iron Oxide: | Magnetite |
| | Flowsheet: | Closed Circuit |
| | Preheat Temperature: | 627° C. |
| | Reducing Gas: | Methane |
| | Excess Ratio: | 2.1 |
| | Iron Phase: | Solid |
| | Product Temperature: | 833° C. |

| Feed: | $Fe_3O_4$ | $CH_4$ | $H_2$ | $O_2$ | Total |
|---|---|---|---|---|---|
| Kg | 1383 | 334 | 49 | 394 | 2160 |
| | | O = 1777 | F = 383 | O/F = 4.64 | |

| Product: | Fe | $CH_4$ | $H_2$ | CO | $CO_2$ | $H_2O$ | |
|---|---|---|---|---|---|---|---|
| Kg | 1000 | 0.4 | 90.0 | 400.4 | 286.1 | 382.7 | 2159.6 |
| Gas wt % | | 0.01 | 7.76 | 34.53 | 24.67 | 33.0 | |

The hot gas stream contains 42.29% by mass of a hydrogen rich syngas with molar $H_2/CO$ ratio of 3.15. The remaining gases are 24.67% $CO_2$ and 33% steam.

Cost Estimates

With current interest focused on the reduction of atmospheric carbon dioxide and the long term goal of a hydrogen economy, future costs for hydrogen and electric power are projected to decrease significantly. There is also interesting research into novel power generation technology that could become commercial in the medium term future. One example is the use of nano pulse technology as reported by Dharmaraj and Kumar (IJEE vol 3, 1, 2012 pp 129-136) They report experimental results of 0.58 W for the production of 0.58 ml/s of hydrogen, that is 1 kWh per 3600 L. A more conservative value of 1 kWh for 3000 L is used below.

The amount of hydrogen required for the production of 1000 kg of metallic iron varies greatly with plant configuration as shown in the following table:

| Flowsheet | Kg $H_2$ | Kg $CH_4$ |
|---|---|---|
| Case 4 FIG. 8 | 224 | 0 |
| Case 5 FIG. 9 | 182* | 0 |
| Case 7 FIG. 11 | 49 | 334 |

*Recycled so no net demand.

In the case of hydrogen as the reducing gas, the products are metallic iron and oxygen only. If the IFDR plant is adjacent to a pellet plant or sinter plant, the oxygen can be used to enrich the combustion air. However without corresponding cost benefit data, the following cost estimates do not include any oxygen credits. A recent NEL estimate of the cost of hydrogen produced by electrolysis and wind power in Minnesota gave figures in the range $3.15 to $3.25 per kg of hydrogen. An average of $3.20/kg is used in the following IFDR estimates:

Case 5: Hydrogen. Closed circuit with pre-heat
No credit for excess oxygen

| | Units | Cost $ | Total $ |
|---|---|---|---|
| Taconite Concentrate | Metric tons | 1.5 | 45.00 | 67.50 |
| Water | 750 gal | 0.3 | 2.00 | 0.60 |
| Hydrogen by electrolysis | Kg | 60 | 3.20 | 192.0 |
| Labor | Man Hours | 0.5 | 35.00 | 17.50 |
| Maintenance & Other | $/t | 15 | 1.00 | 15.00 |
| Briquetting | $/t | 1 | 10.00 | 10.00 |

Total Cost 302.6
Iron Concentration 97%

Case 7: Natural gas and off-gas going to pellet plant

| | Units | Cost $ | Total $ |
|---|---|---|---|
| Taconite Concentrate | Metric tons | 1.5 | 45.00 | 67.50 |
| Water | 750 gal | 0.3 | 2.00 | 0.60 |
| Natural Gas | Kg | 334 | 0.20 | 66.80 |
| Hydrogen | Kg | 49 | 3.20 | 156.80 |
| Labor | Man Hours | 0.5 | 35.00 | 17.50 |
| Maintenance & Other | $/t | 15 | 1.00 | 15.00 |
| Briquetting | $/t | 1 | 10.00 | 10.00 |

Total Cost 334.2
Iron Concentration 97%

Future Projection:

With a nano pulse power supply for electrolysis Case 5 hydrogen requirements are 60 kg or 672,000 L=224 kWhr At $0.07/kWh the cost for power is $47.73 per metric ton of iron.

| | Units | Cost $ | Total $ |
|---|---|---|---|
| Taconite Concentrate | Metric tons | 1.5 | 45.00 | 67.50 |
| Water | 750 gal | 0.3 | 2.00 | 0.60 |
| Electricity | kWh | 224 | 0.07 | 15.68 |
| Labor | Man Hours | 0.5 | 35.00 | 17.50 |
| Maintenance & Other | $/t | 15 | 1.00 | 15.00 |
| Briquetting | $/t | 1 | 10.00 | 10.00 |

| | Units | Cost $ | Total $ |
|---|---|---|---|
| Total Cost | | | 126.28 |
| Iron Concentration 97% | | | |

UBS estimates for Shaft Furnace DRI and Mesabi Nuggets are given below for comparison. Case 5 and case 7 above are comparable Whereas the future estimate indicates the substantial cost benefits achievable with low electrolysis costs.

DRI Shaft Cost Assumptions
Source: Energiron, Midrex, UBS estimates

| | Units | | Cost $ | |
|---|---|---|---|---|
| Iron Ore | Tons | 1.45 | 170 | $246.5 |
| Natural Gas | mmbtu | 8.9 | 3.75 | $ 33.5 |
| Electricity | kwh | 95 | 0.07 | $ 6.7 |
| Labor | Man Hours | 0.14 | $ 35 | $ 4.9 |
| Maintenance and Other | $/t | 15 | $ 1 | $ 15.0 |

Total Cost $306.5
Iron Concentration 92.0%
Assuming ore cost is the same adjusted cost is $ DRI Rotary Hearth Furnace Cost Assumptions
Source: Midrex, UBS estimates

| | Units | | Cost $ | |
|---|---|---|---|---|
| Iron Ore | Tons | 1.6 | 155.0 | $248.0 |
| Thermal Coal | Tons | 0.5 | 65 | 32.5 |
| Natural Gas | mmbtu | 4.4 | 3.75 | 16.3 |
| Electricity | kwh | 200 | 0.07 | 14.0 |
| Labor | Man Hours | 0.2 | 35 | 7.0 |
| Maintenance and Other | $/t | 30 | 1 | 30.0 |

Total Cost $347.8
Iron Concentration 96.5%

Note:
See NUCOR estimate below for DRI costs of $369.

Molten Iron

For the production of 1000 kg of molten iron from magnetite using a nano pulse power supply for electrolysis 3,482,000 L of hydrogen is required. The power needed is 3,482,000/3000=1,160 kWh. At $0.07/kWh the cost for power is $81.26 per metric ton of iron.

| | Units | Cost $ | Total $ |
|---|---|---|---|
| Taconite Concentrate | Metric tons | 1.5 | 45.00 | 67.50 |
| Water | 750 gal | 0.7 | 2.00 | 1.40 |
| Electricity | kWh | 1,160 | 0.07 | 81.26 |
| Labor | Man Hours | 0.5 | 35.00 | 17.50 |
| Maintenance & Other | $/t | 15 | 1.00 | 15.00 |
| Briquetting | $/t | 1 | 10.00 | 10.00 |

Total Cost. 192.66
Iron Concentration 99%

Note:
See NUCOR estimate below for "Adjusted" pig iron cost of $436

| DRI and PIG IRON COSTS (extract from NUCOR PRESENTATION March 2014) DRI VERSUS PIG IRON COST COMPARISON (using estimated long-term prices) | | |
| --- | --- | --- |
| $/ton | | |
| Iron Ore (62% FE, FOB Brazil) | $125 | $125 |
| Pellet Premium | $ 40 | $ 40 |
| Iron Premium (BF = 65% Fe & DRI = 68% Fe) | $ 7 | $ 13 |
| Freight | $ 25 | $ 15 |
| Iron Ore Consumption (BF = 1.6 ton & DRI = 1.5 ton) | $315 | $290 |
| Cash Conversion Costs | $ 70 | $ 35 |
| BF Reductant (100% coke) | $107 | |
| DRI Reduction (11 mmbtus @$4) | | $ 44 |
| Iron Unit Cost | $492 | $369 |
| BF with sinter plant cost savings | $ 30 | |
| BF Cost Savings by Substituting 40% coke Usage with PCI & natural gas | $ 11 | |
| BF Higher "Value-In-Use" Benefit | $ 15 | |
| Adjusted BF Iron Unit Cost | $436 | |

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A process for producing metallic iron from iron oxide fines, the process comprising:
   a) feeding iron oxide fines into the mixing chamber of an In-Flight reactor,
   b) creating an internal heat-generating gas comprising hydrogen and oxygen generated by the electrolysis of water in an electrolyzer,
   c) introducing a stream of an internal heat-generating gas into said mixing chamber,
   d) introducing a stream of a reducing gas into said mixing chamber,
   e) delivering the mixed iron oxide, reducing gas, and heat-generating gas into a reducing reaction flame through a burner nozzle, and
   f) forming hot metallic iron entrained in a hot exhaust gas.

2. The process according to claim 1 wherein said reducing gas and internal heat-generating gas are premixed prior to introduction into said mixing chamber.

3. The process according to claim 1 wherein the internal heat-generating gas is a stoichiometric mixture of oxygen and hydrogen produced in an electrolyzer.

4. The process according to claim 1 wherein the internal heat-generating gas may include a combination of oxygen and natural gas.

5. The process according to claim 1 wherein the internal heat-generating gas is a combination of oxygen and any carbon based fuel.

6. The process according to claim 1 wherein the reducing gas is hydrogen.

7. The process according to claim 1 wherein the reducing gas is natural gas.

8. The process according to claim 1 wherein the reducing gas is a combination of natural gas and hydrogen.

9. The process according to claim 1 wherein the reducing gas is a combination of any carbon based fuel and hydrogen.

10. The process according to claim 1 wherein the reducing gas is an industrial process exhaust gas with high reduction potential.

11. The process according to claim 1 wherein a fine solid biomass is entrained within the reducing gas.

12. The process according to claim 1 wherein the product is cooled to a temperature below the Curie point for iron and the solid iron product is recovered by magnetic separation.

13. The process according to claim 1 wherein the solid iron product is separated from the product gases by any conventional gas/solid separation equipment.

14. The process according to claim 1 wherein the product gases are fed into a condenser and the condensed water is recycled to the said electrolyzer.

15. The process according to claim 1 wherein the product gases are fed into a condenser and the hydrogen is recycled and combined with the feed hydrogen stream.

16. The process according to claim 1 wherein the flame temperature is controlled by the flow rate of the heat generating gas.

17. The process according to claim 1 wherein the temperature is controlled to a value below the melting point of iron to produce solid iron.

18. The process according to claim 1 wherein the temperature is controlled to a value above the melting point of iron to produce molten iron.

19. A process for producing metallic iron from iron oxide fines, the process comprising:
   a) feeding iron oxide fines into the mixing chamber of an In-Flight reactor,
   b) creating an internal heat-generating gas,
   c) introducing a stream of the internal heat-generating gas into said mixing chamber,
   d) introducing a stream of a reducing gas into said mixing chamber,
   e) delivering the mixed iron oxide, reducing gas, and heat-generating gas into a reducing reaction flame through a burner nozzle, and
   f) forming hot metallic iron entrained in a hot exhaust gas.

20. The process for producing metallic iron from iron oxide fines of claim 19 wherein the internal heat-generating gas comprises hydrogen and oxygen generated by the electrolysis of water in an electrolyzer.

* * * * *